(12) United States Patent
Baumann

(10) Patent No.: US 7,201,451 B2
(45) Date of Patent: Apr. 10, 2007

(54) AIRCRAFT PASSENGER SEAT

(75) Inventor: Jurgen Baumann, Bodman-Ludwigshafen (DE)

(73) Assignee: Recaro Aircraft Seating GmbH & Co. KG., Schwabisch Hall (DE)

( * ) Notice: Subject to any disclaimer, the term of this patent is extended or adjusted under 35 U.S.C. 154(b) by 0 days.

(21) Appl. No.: 11/059,639

(22) Filed: Feb. 17, 2005

(65) Prior Publication Data

US 2005/0184575 A1    Aug. 25, 2005

(30) Foreign Application Priority Data

Feb. 20, 2004   (DE)   ................ 10 2004 008 267

(51) Int. Cl.
*A47C 7/50* (2006.01)

(52) U.S. Cl. .............. 297/423.36; 297/423.34; 297/70

(58) Field of Classification Search ........... 297/423.36, 297/423.34, 70
See application file for complete search history.

(56) References Cited

U.S. PATENT DOCUMENTS

| | | | | |
|---|---|---|---|---|
| 1,679,426 A | * | 8/1928 | Howe | 108/130 |
| 1,902,795 A | * | 3/1933 | Wolters | 312/331 |
| 2,563,629 A | * | 8/1951 | Watter | 297/423.36 |
| 2,571,080 A | * | 10/1951 | Watter | 297/423.36 |
| 2,602,490 A | * | 7/1952 | Earl | 297/423.15 |
| 3,863,980 A | * | 2/1975 | Ciner | 297/69 |
| 5,352,020 A | | 10/1994 | Wade et al. | |
| 5,507,562 A | * | 4/1996 | Wieland | 297/423.2 |
| 5,651,587 A | * | 7/1997 | Kodaverdian | 297/423.36 |
| 6,081,976 A | | 7/2000 | Nelsen | |
| 6,695,406 B2 | * | 2/2004 | Plant | 297/423.26 |
| 6,742,206 B1 | * | 6/2004 | Han | 5/618 |
| 6,773,074 B2 | * | 8/2004 | Flory et al. | 297/423.34 |
| 2001/0015566 A1 | * | 8/2001 | Park et al. | 297/115 |
| 2002/0063449 A1 | | 5/2002 | Plant | |
| 2002/0101106 A1 | * | 8/2002 | Kim et al. | 297/362.11 |
| 2002/0109389 A1 | | 8/2002 | Satoh | |

FOREIGN PATENT DOCUMENTS

| | | |
|---|---|---|
| EP | 1 116 653 A2 | 7/2001 |
| WO | WO 02/051703 A1 | 7/2002 |

* cited by examiner

*Primary Examiner*—David R. Dunn
*Assistant Examiner*—Sarah B. McPartlin
(74) *Attorney, Agent, or Firm*—Roylance, Abrams, Berdo & Goodman, L.L.P.

(57) ABSTRACT

A drive (35, 37) reversible to two active states for optional generation of a force of displacement effecting retraction or extension of a foot rest configuration (11) is provided in an aircraft seat. The seat has seat components such as backrest seat element (1), and leg rest (9) coupled to the front edge area (3) of the seat element and pivotable between a lowered non-use position and raised use position. A foot rest configuration (11) is mounted to be movable longitudinally on the leg rest (9) between a retracted position and an extended position to form an extension of the leg rest (9). The leg rest is coupled to drive (35, 37) which may be switched between an inactive state of rest and an active state generating a force for displacement of the foot rest configuration (11).

9 Claims, 3 Drawing Sheets

AIRCRAFT PASSENGER SEAT

FIELD OF THE INVENTION

The present invention relates to an aircraft passenger seat having seat components such as backrest, seat element, and a leg rest. The leg rest is coupled to the front edge area of the seat element and may be pivoted between a lowered non-use position and raised use positions. A foot rest configuration is movable longitudinally on the leg rest between a retracted position and an extended position to form an extension of the leg rest, and is connected to a drive switchable between an inactive rest state and an active state generating a displacement force applied to the foot rest configuration.

BACKGROUND OF THE INVENTION

Aircraft passenger seats with backrests, seat elements, leg rests and foot rests are disclosed, e.g., in U.S. Pat. No. 5,352,020. The possibility of increasing the total length of the leg rest plus foot rest configuration provides a sufficiently long application surface available to the seat occupant, although only the short structural length extending from the seat element to the cabin floor is available in the non-use position for leg rest and foot support configuration.

A spring force accumulator, which may be blocked and unblocked by a control valve operable by the seat occupant, is provided for application of the force of displacement to the foot rest configuration in the disclosed aircraft passenger seat. When the spring force accumulator is unblocked, a displacement force acting on the foot rest configuration retracts the latter into the leg rest. To extend the foot rest configuration when in the raised position, the seat occupant must use leg muscles to extend the foot rest against the retraction force generated by the spring force accumulator into the use position and then block the spring force accumulator by actuating the control valve.

The value for the displacement force generated by the spring force accumulator must be high enough to ensure reliable retraction. Thus, seat occupant suffers the disadvantage of strenuous operation, since the displacement force must be overcome to use the foot rest configuration.

SUMMARY OF THE INVENTION

Objects of the present invention are to provide an aircraft passenger seat with a leg rest and foot rest having an especially easy operation.

According to the present invention, these objects are attained with an aircraft passenger seat in which a reversible drive may be switched to two states of operation for optional generation of a displacement force effecting retraction or extension of the foot rest configuration.

While in a conventional aircraft passenger seat, only retraction of the foot rest configuration is effected by the drive, that is, only a control measure is required for the retraction, the present invention allows moving the foot rest configuration into the use position desired by motive means as well. By a simple control measure not requiring the expenditure of force, a maximal degree of convenience of operation is achieved.

In preferred exemplary embodiments, the drive has an electric gear motor permitting reversal of the direction of rotation. Consequently, only operation of an electric switch configuration is required for control, ensuring the greatest reliability and convenience of operation.

In exemplary embodiments in which the geared motor has a pinion on its output side, the pinion may engage two parallel racks with one end hinge-connected to the structure of the leg rest and the other end hinge-connected to this movable foot rest configuration. An especially compact design is obtained in this configuration for the entire drive, that is, for the motor and the associated drive gear. The configuration providing this compact design allows it to be integrated into the structure of the leg rest without design difficulties.

An especially simple design is obtained if the racks are mounted on the housing of the drive motor so as to be movable. The housing of the gear motor can be cantilevered on the racks guided in it. The desired compact structure of the gear configuration as a whole is obtained. Additionally, an especially long displacement path may be achieved by the rack-and-pinion configuration, which path having a length only slightly shorter than the combined lengths of the two racks.

To achieve the greatest possible length for the displacement path, racks should have the greatest possible length. When the foot rest configuration is in the retracted position, the ends of the racks are coupled to the structure of the leg rest and to the structure of the slide of the foot rest configuration at points at which the racks extend approximately diagonally to the rectangular surface of the bottom elements of the leg rest and foot rest configuration. Accordingly, optimal use is made for the installed racks of the entire structural space allotted for mounting of the gearing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
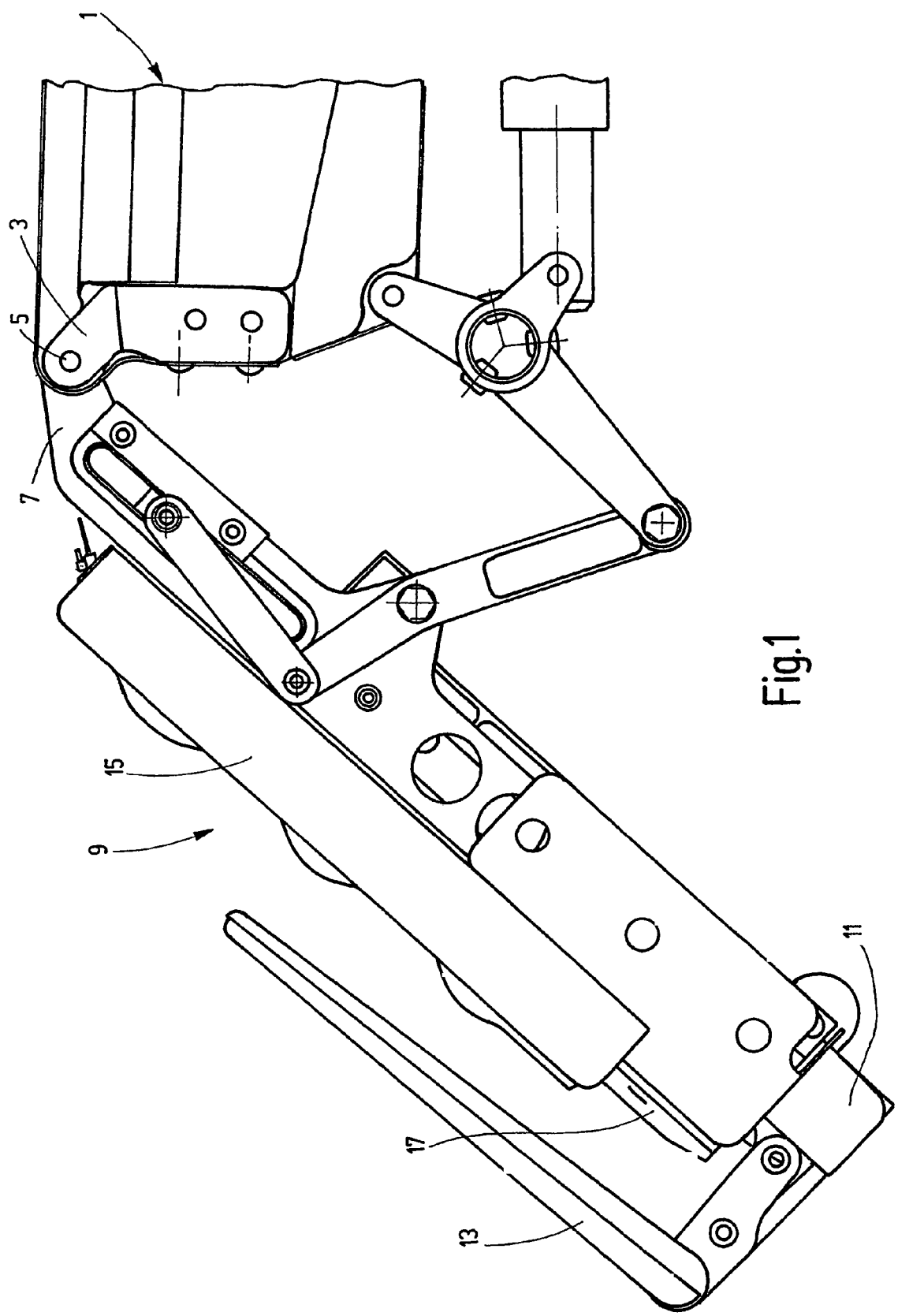
FIG. 1 is a partial, side elevational view only of the front edge area of the seat element of an aircraft passenger seat according to an embodiment of the present invention, with the seat cushion not being shown and with the foot rest configuration retracted into the leg rest and the leg rest being only slightly elevated from the non-use position.

FIG. 1 shows the front edge area of a seat element 1, detached and without the seat cushion placed in position. At a pivot point 3 of the edge area, the upper end of a carrier structure 7 for leg rest 9 is pivotable by a joint bolt 5 in FIG. 1. A foot rest configuration 11 may be retracted into and extended from this leg rest 9. As seen only in FIG. 1, a conventional hinged tread element 13, shown in the folded position in FIG. 1, is positioned at the (lower) front end of the foot rest configuration 11.

Figure 2:
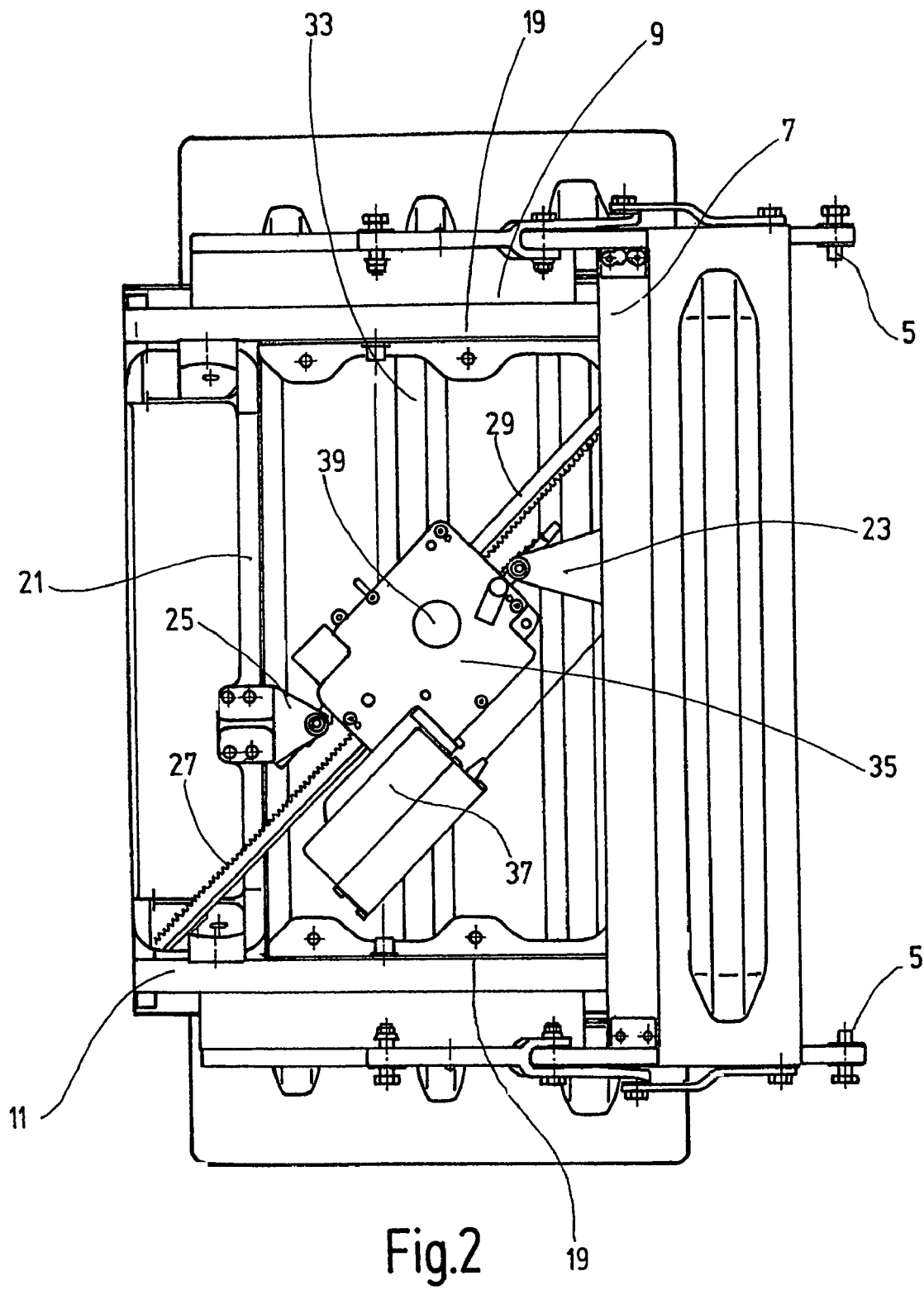
FIG. 2 is a top plan view of the leg rest with the foot rest configuration of FIG. 1 retracted into it, drawn on a smaller scale, with cushion carriers of leg rest and foot rest configuration being omitted to permit inspection of the box-like structures of the leg rest and foot rest configuration.
Figure 3:
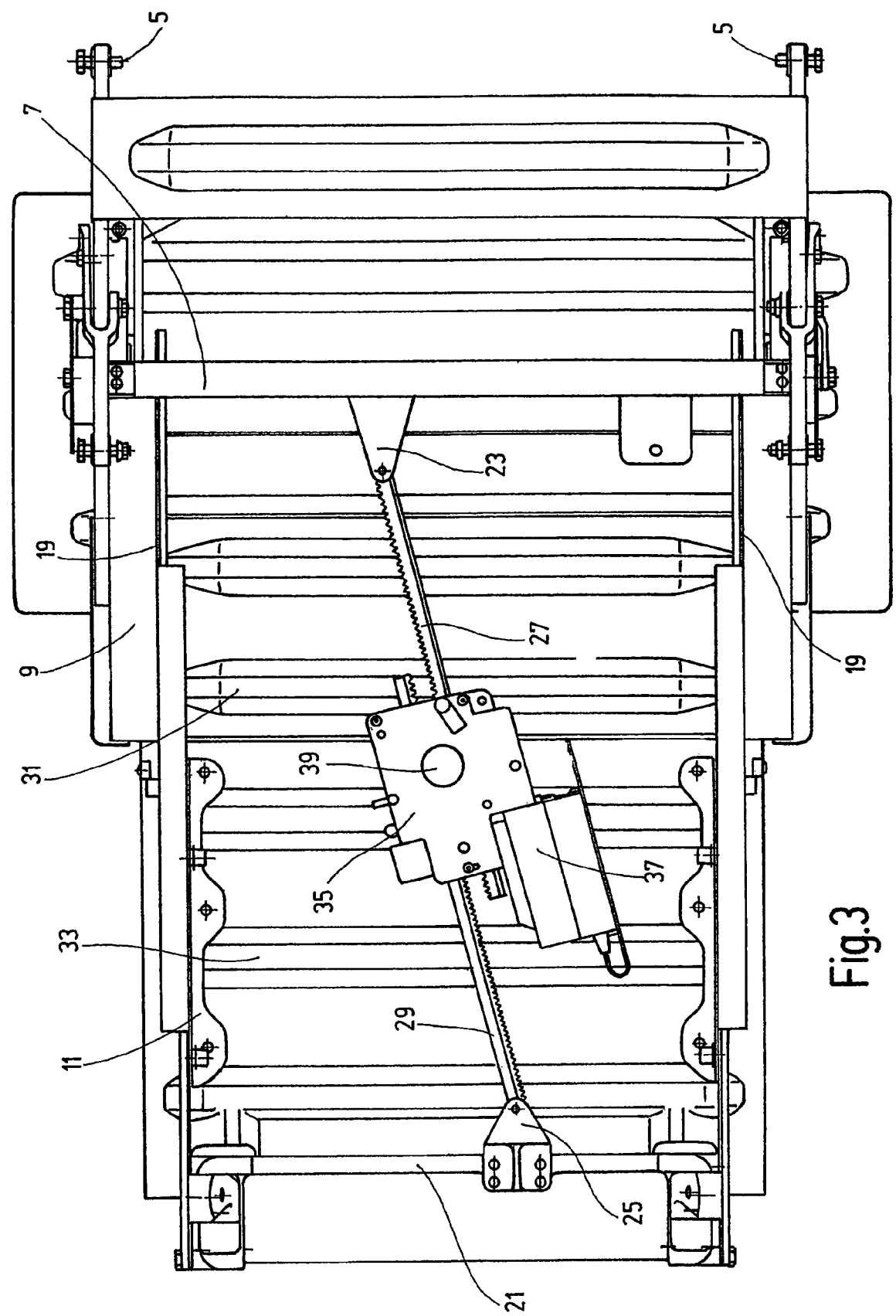
FIG. 3 is a top plan view of the leg rest, corresponding to FIG. 2, but with the foot rest configuration shown in the fully extended position.

In FIG. 1, a cushion carrier 15 of the leg rest 9 is shown without cushion cover. In addition, FIG. 1 shows the end area of a cushion carrier 17 of the foot rest configuration 11. Neither the cushion carrier 15 of the leg rest 9 nor the cushion carrier 17 of the foot rest configuration 11 is shown in FIGS. 2 and 3 to view the interior of the structures 7 and 21 of leg rest 9 and foot rest configuration 11, both of which are configured as flat boxes. The foot rest configuration 11 suitably telescopes into the carrier structure 7 of the leg rest 9. The side walls 19 of the carrier structure form a displacement guide for the structure 21 of the leg rest 11.

As seen in FIGS. 2 and 3, a pivot bearing 23 is on the structure 7 of the leg rest 9, and a pivot bearing 25 is on the structure 21 of the foot rest configuration 11. The end of a rack 27 is coupled to the pivot bearing 23 of the leg rest 9, while a similar rack 29 is coupled to the pivot bearing 25 of the foot rest configuration 11. The configuration of the racks 27 and 29 is such that they are movable in one common swiveling plane extending parallel to the primary plane of the bottom elements 31 and 33 of the structure 7 of the leg rest 9 and the structure 21 of the foot rest configuration 11. The racks 27 and 29 are contained in the housing 35 of an electric gear motor 37 so that the pinion of the motor on the output side (represented only by a circle 39 in FIGS. 2 and 3) is positioned between the two racks 27 and 29 and engages these two racks.

FIG. 2 shows a foot rest configuration 11 in the position in which it is fully retracted into the leg rest 9. The coupling points of the racks 27 and 29 are displaced in relation to the primary longitudinal axis of leg rest 9 and foot rest configuration 11 so that the racks 27 and 29 extend approximately diagonally relative to the rectangular surface defined by the bottom element 33 of the structure 21. This orientation results in the best possible use of the space available for accommodating the racks 27, 29, so that an advantageously longer displacement path is available because of the corresponding length of the racks 27, 29.

FIG. 3 shows a foot rest configuration 11 extended approximately over three-quarters of its path. Approximately the combined length of the two racks 27, 29 is available for the length of the displacement path, so that a sufficiently great extension length is available despite the compactness provided in the retracted state. Comparing FIG. 2 to FIG. 3 also indicates that the position of the unit of gear motor 37 and gear housing 35 in relation to the structures 7 and 21 may be varied. This variation is due to the circumstance that the unit of gear motor 37 and gear housing 35 is cantilevered on the racks 27 and 29.

The configuration of the drive, in the form of a gear motor with pinion on the output side which engages two parallel racks 27, ensures a great extension length despite the small structural length. The structural length is limited by the distance between seat element and cabin floor. The especially compact configuration of the drive as a whole permits it to be installed without difficulty in the box-like structures 7 and 21 of leg rest 9 and foot rest configuration 111 below their cushion carriers 15, 17.

While one embodiment has been chosen to illustrate the invention, it will be understood by those skilled in the art that various changes and modifications can be made therein without departing from the scope of the invention as defined in the appended claims.

What is claimed is:

1. An aircraft passenger seat, comprising:
a seat element having a front edge area;
a leg rest pivotally coupled to said front edge area for movement between a lowered non-use position and a raised use position;
a foot rest mounted on said leg rest for longitudinal movement between a retracted position and an extended position forming an extension of said leg rest;
a reversible drive switchable between an inactive rest state, a first active state generating a first displacement force to retract said foot rest and a second active state generating a second displacement force to extend said foot rest, said drive including an electric gear motor permitting two opposite directions of rotation and first and second parallel racks, said gear motor including an output pinion engaging said first and second racks, one end of said first rack being coupled to said leg rest, one end of said second rack being coupled to said foot rest.

2. An aircraft passenger seat according to claim 1 wherein a backrest is coupled to said seat element.

3. An aircraft passenger seat according to claim 1 wherein said gear motor comprises a motor housing, said racks being displaceable with and relative to said motor housing.

4. An aircraft passenger seat according to claim 3 wherein said gear motor and said housing are mounted on said racks in a cantilever manner.

5. An aircraft passenger seat according to claim 4 wherein said leg rest comprises a flat box structure with an open top, with an upper side covered by a leg rest cushion carrier, with side walls extending from said leg rest cushion carrier, and with a bottom element coupled to ends of said side walls remote from said leg rest cushion carrier; and
a displacement guide for retracting said foot rest into said flat box structure between said cushion carrier and said bottom element.

6. An aircraft passenger seat according to claim 5 wherein said foot rest comprises a hollowed slide with a bottom element extending in close proximity to said bottom element of said leg rest when said foot rest is in said retracted position to create a space between said bottom element of said foot rest and said cushion carrier of said leg rest receiving said gear motor.

7. An aircraft passenger seat according to claim 6 wherein said bottom elements have rectangular configurations; and
said one ends of said first and second racks are mounted at coupling points on said flat box structure and said slide, respectively, such that longitudinal axes of said racks extend approximately diagonally relative to said rectangular configurations in said retracted position.

8. An aircraft passenger seat according to claim 1 wherein mating guides are mounted on said leg rest and foot rest to control relative sliding movement thereof and are laterally spaced from said reversible drive.

9. An aircraft passenger seat according to claim 8 wherein said guides comprise side walls of said leg rest.

* * * * *